(12) United States Patent
Poscher et al.

(10) Patent No.: US 10,237,092 B2
(45) Date of Patent: Mar. 19, 2019

(54) TECHNIQUE FOR ROUTING AND SWITCHING REDUNDANCY

(71) Applicant: Telefonaktiebolaget LM Ericsson (publ), Stockholm (SE)

(72) Inventors: Jens Poscher, Aachen (DE); Ralph Detke, Herzogenrath (DE); Stefan Eichinger, Köln (DE); Sevil Senturk, Herzogenrath (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/549,424

(22) PCT Filed: Mar. 12, 2015

(86) PCT No.: PCT/EP2015/055226
§ 371 (c)(1),
(2) Date: Aug. 8, 2017

(87) PCT Pub. No.: WO2016/141995
PCT Pub. Date: Sep. 15, 2016

(65) Prior Publication Data
US 2018/0026814 A1 Jan. 25, 2018

(51) Int. Cl.
*H04L 12/66* (2006.01)
*H04L 12/46* (2006.01)
(Continued)

(52) U.S. Cl.
CPC .......... *H04L 12/66* (2013.01); *H04L 12/2859* (2013.01); *H04L 12/2869* (2013.01);
(Continued)

(58) Field of Classification Search
CPC ... H04L 12/66; H04L 69/324; H04L 12/4641; H04L 12/4633; H04L 12/2859; H04L 12/2869; H04L 45/28; H04L 47/72
(Continued)

(56) References Cited

U.S. PATENT DOCUMENTS 9,100,214 B1 * 8/2015 Joseph ............... H04L 12/4641
2014/0071811 A1 * 3/2014 Niu ..................... H04L 41/0893
370/221

(Continued)

FOREIGN PATENT DOCUMENTS

EP 2209260 A1 7/2010
EP 2536068 A1 12/2012
WO 2014068984 A1 5/2014

OTHER PUBLICATIONS

Cohen, A. et al., "Migration to Ethernet-Based DSL Aggregation", Technical Report DSL Forum TR-101, Apr. 2016, pp. 1-101, Architecture and Transport Working Group.

*Primary Examiner* — Faisal Choudhury
(74) *Attorney, Agent, or Firm* — Coats & Bennett, PLLC

(57) ABSTRACT

A technique for routing datagrams between customer equipments, CEs, (102) and a pool (110) of broadband network gateways, BNGs, (112) is provided. As to a device aspect (120) of the technique, a first establishing unit (122) is configured to establish a first connection (123) between the device (120) and each of the CEs (102). A second establishing unit (124) is configured to establish a second connection (125) between the device (120) and each BNG (112) in the pool (110) of BNGs (112). A mapping unit (126) is configured to map each of the first connections (123) to one of the second connections (125). The mapping specifies the routing of the datagrams.

20 Claims, 5 Drawing Sheets

(51) Int. Cl.
*H04L 29/08* (2006.01)
*H04L 12/28* (2006.01)
*H04L 12/703* (2013.01)
*H04L 12/911* (2013.01)

(52) U.S. Cl.
CPC ...... *H04L 12/4633* (2013.01); *H04L 12/4641* (2013.01); *H04L 45/28* (2013.01); *H04L 47/72* (2013.01); *H04L 69/324* (2013.01)

(58) Field of Classification Search
USPC .......................................................... 370/401
See application file for complete search history.

(56) References Cited

U.S. PATENT DOCUMENTS

| | | | |
|---|---|---|---|
| 2015/0271102 A1* | 9/2015 | Antich | H04L 47/825 |
| | | | 370/230 |
| 2016/0014071 A1* | 1/2016 | Asati | H04L 61/6063 |
| | | | 709/245 |
| 2017/0093834 A1* | 3/2017 | Natu | H04L 12/2852 |

* cited by examiner

TECHNIQUE FOR ROUTING AND SWITCHING REDUNDANCY

TECHNICAL FIELD

The present disclosure generally relates to a technique for routing datagrams. More specifically, and without limitation, a device and a method are provided for routing datagrams between customer equipments and a plurality of broadband network gateways.

BACKGROUND

A customer equipment (CE), e.g. a Digital Subscriber Line (DSL) router at the premises of a fixed-line subscriber, maintains a layer-2 connection with a broadband network gateway (BNG) hosting services, e.g., an Internet access. In order to achieve BNG redundancy for a plurality of CEs, each of multiple BNGs would have to precautionarily maintain a layer-2 connection with each of the CEs. Since the number of connections scales quadratically with system size, this is an inefficient way of realizing redundancy in terms of scalability, maintenance and provisioning.

Existing architectures for customer networks further include an access node (e.g., a DSL Access Multiplexer, DSLAM) functioning as an ATM or Ethernet aggregator that cross-connects the layer-2 interface from the CEs to the layer-2 interface of the BNG. The traffic aggregated from the access nodes is steered to the BNG as an IP node. Point-to-point sessions are established between the CE and the BNG, e.g., using the Point-to-Point Protocol (PPP) over Ethernet (PPPoE), which ensures that all PPPoE frames sent on the wire reach the other end.

However, for realizing redundancy when the access node is connected to the BNG using a layer-2 connection in a transport network, point-to-point or point to multipoint links would have to be provided in the transport network for each of the CEs. Therefore, current BNG deployments implement no node redundancy or a 1+1 BNG redundancy. The latter is far away from being an optimal redundancy solution in terms of cost efficiency and flexibility. Moreover, no automatic load balancing can be done between the BNGs for newly connecting CEs.

SUMMARY

Accordingly, there is a need for a technique that allows efficiently using a plurality of broadband network gateways.

As to one aspect, a device for routing datagrams between customer equipments (CEs) and a pool of broadband network gateways (BNGs) is provided. The device comprises a processor configured to trigger establishing a first connection between the device and each of the CEs, to trigger establishing a second connection between the device and each BNG in the pool of BNGs, and to map each of the first connections to one of the second connections, the mapping specifying the routing of the datagrams.

The CEs may include a customer edge router and/or a modem, e.g., a DSL modem or a cable modem. The BNGs may be connected to an Internet backbone. The device may be implemented at a provider edge (PE) router. E.g., the device may be implemented at a fixed-mobile convergence (FMC) router. Alternatively or in addition, the device may be implemented at an access node (AN).

The mapping may be dynamical. The pool may include at least two or three BNGs. At least two first connections and/or at least two or three second connections may be established.

The routing may include forwarding datagrams of one of the first and second connections to the other one of the first and second connections. The first connections and/or the second connections may be based on a packet-switched communications protocol, e.g., an Asynchronous Transfer Mode, ATM, communications protocol or an Ethernet communications protocol. The datagram may be a cell (e.g., an ATM cell) or a frame (e.g., e.g., an Ethernet frame).

The mapping may include storing a forwarding rule for the mapped first and second connections. The forwarding rule may specify the forwarding of an incoming access frame on the first connection to an outgoing frame on the second connection.

Each of the first connections may include a Data Link layer tunnel (also referred to as a layer 2 tunnel). Each of the first connections between the device and the CEs may be defined by a tagged virtual local area network (VLAN).

The first connections may be defined by different VLANs. The first connections may include multipoint connectivity. The first connections may be established according to IEEE 802.1Q. The first connection may be defined by a C-tag.

Each of the second connections may include a Data Link layer tunnel (also referred to as a layer 2 tunnel). The second connection may be based on a layer-2 VPN, e.g., over an Internet Protocol (IP) network or a Multiprotocol Label Switching (MPLS) network. The second connections may include pseudo-wires (PWs), e.g., in a Virtual Private LAN Service (VPLS) domain.

Alternatively or in addition, some or each of the second connections between the device and the BNGs in the pool may be defined by different VLANs. The VLANs defining the second connections may be stacked, e.g., according to the standard IEEE 802.1ad (also referred to as QinQ). Each CE may be associated with one QinQ VLAN tag. E.g., the datagrams may include a first tag (e.g., a C-tag) associated with one of the CEs and a second tag (e.g., an S-tag) associated with an access node or one of the BNGs. Alternatively or in combination, the second connections may be defined by different PWs, e.g., according to the Request for Comments (RFC) 3985.

One or more first connections may be mapped to one or each of the second connections. E.g., one or more stacked VLANs may be mapped to one of the PWs, wherein the VLAN is CE-specific and the PW is BNG-specific.

Establishing the first connection may be triggered in response to a subscriber update and/or a time-out of a previous connection to the corresponding one of the CEs. Each of the CEs and the device may be arranged for static point-to-point communication.

After establishment of layer-2 connectivity between CE and BNG, upper layer may establish their sessions, e.g., initiated by the CE. The device (e.g., the processor) may further be configured to bidirectionally forward point-to-point protocol (PPP) messages according to the mapping. Any data link protocol, e.g., the point-to-point protocol, may be used for authentication.

The device may be statically configured with information about a capacity of at least one of the BNGs in the pool and the second connections, and/or the processor may further be configured to receive or estimate a capacity for at least one of the BNGs in the pool and the second connections. Information as to the capacity for at least one of the BNGs in the pool and the second connections may be maintained at the device. The device may further comprise a database configured to maintain a list of available BNGs and the associated capacity information or an interface for accessing the database.

The processor may regularly or periodically trigger sending messages towards the BNGs in the pool for determining an availability of the BNGs in the pool and/or the second connections. The messages may be keep-alive messages or datagrams without data payload. Alternatively or in addition, a keep-alive mechanism according to an underlying communication protocol may be employed.

The mapping of the first connections to the second connections may depend on at least one of the availability and the capacity. E.g., the mapping may provide for load balancing between the BNGs. The first connections may be consecutively mapped to the second connections according to a sequence. The second connection that is next according to the sequence may be skipped, if the next second connection or the corresponding BNG is not available or has an insufficient capacity.

Each of the first connections may be mapped to the second connection having the highest capacity. Alternatively or in addition, the first connections may be mapped to the second connections so that the capacities of the second connections and/or the BNGs reduced by respective capacities of the corresponding first connections are balanced. Alternatively or in addition, the first connections may be mapped to the second connections in a round-robin scheme. The second connection that is next according to the round-robin scheme may be skipped, if the next second connection or the corresponding BNG is not available or has an insufficient capacity. As a still further alternative or in addition, the connections may be mapped depending on a preference, e.g. a preference defined for one or more of the CEs in relation to one or more of the BNGs. By way of example, a local preference may prefer the BNG that is physically or topologically close or closest to the device and/or the CE.

The processor is further configured to map and/or trigger establishing a further second connection if a sum of the capacities or the availabilities is less than a sum of capacities of the first connections or a number of the first connections.

The capacity may relate to a capacity (e.g., processing or bandwidth in terms of gigabits per second) or a number of connections (e.g., connections of a certain type such as DSL connections). For the second connections and/or the BNGs, the capacity may relate to a maximum capacity or a maximum number of concurrent connections. For the first connections and/or the CEs, the capacity may relate to a required capacity.

The device may further comprise an interface for setting at least one of the capacity and the availability of one of the BNGs to zero, e.g., for triggering off-loading the BNG.

Establishing a further second connection to a further BNG may be triggered. The further second connection may be triggered by establishing one of the first connections, by an unavailability or maintenance status of one of the second connections, and/or by an unavailability or maintenance status of the corresponding one of the BNGs.

The mapping may be initialized based on an architectural structure of the pool of BNGs. The mapping may include re-mapping one of the first connections to another one of the second connections. The re-mapping may be triggered by establishing one of the first connections, by an unavailability or maintenance status of the second connection previously mapped to the one of the first connections, by an unavailability or maintenance status of the corresponding one of the BNGs, and/or by an availability of one or more further BNGs in the pool.

The first connections may include landlines. The CEs may include fixed-line terminals. A physical layer underlying the first connections and/or the second connections may include at least one of a copper cable, an optical fiber and a microwave link. The optical fiber may include a Single-Mode optical Fiber (SMF) or a Multi-Mode optical Fiber (MMF).

The device may further comprise at least one first interface towards the CEs and/or at least one second interface towards the BNGs. The first connections may use the at least one first interface. The second connections may use the at least one second interface. The device (e.g., the processor) may be further configured to route or trigger routing datagrams between the first interface and second interface.

A physical layer of the first connection may further comprise the AN, e.g., an aggregator, multiplexer or concentrator. The AN may be arranged between the CEs and the device. The AN may aggregate, multiplex or concentrate Asynchronous Transfer Mode (ATM) traffic, Ethernet traffic or digital subscriber line (DSL) traffic. The AN may be a Digital Subscriber Line Access Multiplexer (DSLAM).

As to another aspect, a system for routing datagrams between customer equipments (CEs) and broadband network gateways (BNGs) is provided. The system comprises a pool of BNGs, one or more access nodes (ANs) providing access to the CEs via a virtual local area network (VLAN), and a device connected to the one or more ANs and to the pool of BNGs for routing the datagrams according to the device aspect.

The system may comprise a plurality of the devices. At least one of the ANs may be connected to two or more of the devices. Some or each of the devices may further be connected to at least another one of the ANs that is different from the at least one of the ANs. The at least one of the ANs and the at least another one of the ANs may be allocated to the same pool of BNGs.

As to a further aspect, a method of routing datagrams between customer equipments, CEs, and a pool of broadband network gateways (BNGs) is provided. The method comprises the step of triggering establishing a first connection between the device and each of the CEs, the step of triggering establishing a second connection between the device and each BNG in the pool of BNGs, and the step of mapping each of the first connections to one of the second connections, the mapping specifying the routing of the datagrams.

The method may further comprise any feature disclosed in the context of the device and system aspects. Particularly, the method may comprise one or more steps corresponding to an operation of any one of the processor, the device and the system.

As to a still further aspect, a computer program product is provided. The computer program product comprises program code portions for performing any one of the steps of the method aspect when the computer program product is executed by one or more computing devices. The computer program product may be stored on a computer-readable recording medium. The computer program product may also be provided for download via the BNGs, a data network and/or the Internet.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment, in order to provide a thorough understanding of the technique disclosed herein. It will be apparent to one skilled in the art that the technique may be practiced in other embodiments that depart from these specific details. Moreover, while the following embodiments are primarily described for a Digital Subscriber Line (DSL) access over wires, e.g. according to the Technical Report TR-101 of the Broadband Forum (BBF), it is readily apparent that the technique described herein may also be applied for any other access technology including wired communication (such as fiber optics) or wireless communication (such as microwave links, a Wireless Local Area Network according to the standard family IEEE 802.11 and a Worldwide Interoperability for Microwave Access according to the standard family IEEE 802.16).

Moreover, those skilled in the art appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the units disclosed herein.

Figure 1:
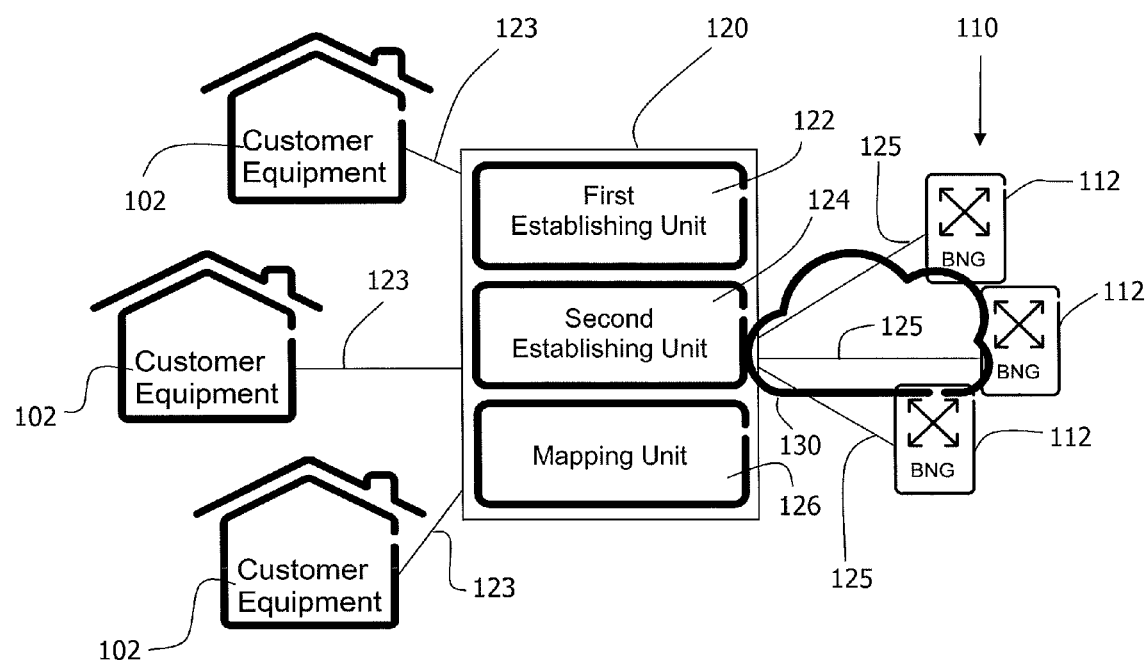
FIG. 1 schematically illustrates a first embodiment of a system for providing broadband access comprising a device for routing datagrams between customer equipments and broadband network gateways.

FIG. 1 schematically illustrates a first embodiment of a system 100 for providing network access to a plurality of Customer Equipments (CEs) 102 as an exemplary environment for implementing the technique. The system 100 comprises a pool 110 of Broadband Network Gateways (BNGs) 112 and a device 120 for routing datagrams between the CEs 102 and the pool 110 of BNGs 112.

The device 120 comprises a first establishing unit 122 configured to trigger establishing a first connection 123 between the device 120 and each of the CEs 102. A second establishing unit 124 is configured to trigger establishing a second connection 125 between the device 120 and each of the BNGs 112 in the pool 110. A mapping unit 126 is configured to map each of the first connections 123 to one of the second connections 125. The mapping specifies the routing of the datagrams that is optionally performed by the device 120.

The device 120 may be implemented in a Provider Edge (PE) router. The PE router serves a certain group of fixed network subscribers, each of which is equipped with at least one of the CEs 102. The PE router may be a Fixed-Mobile Convergence (FMC) access router.

The BNG pool 110 is a logical group of BNGs 112 that may be physically collocated in a pool area. All BNGs 112 in such a pool 110 share the same responsibility of handling the generated subscriber traffic. Each CE 102, i.e., each fixed subscriber, can be served by any BNG 112 within the pool 110. The mapping defines a serving relation. In normal operation, the mapping is once set-up and not changed.

The first connections 123 include individual physical links (e.g., wires, fibers or microwave links). Alternatively or in combination, the first connections 123 include logical connections, e.g., in an access network. By way of example, the first connections 123 are realized as a Queue in Queue (QinQ), e.g., using a stacked Virtual Local Area Network (VLAN). In an embodiment of the device, e.g., implemented in the FMC router, both the first connections 123 and the second connections 125 run on MPLS as VPLS to AN and to BNG, respectively.

The second connections 125 are logical connections in a transport network 130. The second connections 125 are realized as layer-2 tunnels, e.g., using so-called Pseudo Wires (PWs). By way of example, the transport network 130 includes a Virtual Private Network (VPN), e.g., a Virtual Private LAN Service (VPLS). The second connections 125 use Asynchronous Transfer Mode (ATM) or Ethernet as a frame transport mechanism. The transport network 130 uses MPLS or IP as a packet transport mechanism. The PWs may use a Layer-2 Tunneling Protocol (L2TP, e.g., Version 3) or Ethernet over MPLS (EoMPLS) specified by the Internet Engineering Task Force (IETF).

Figure 2:
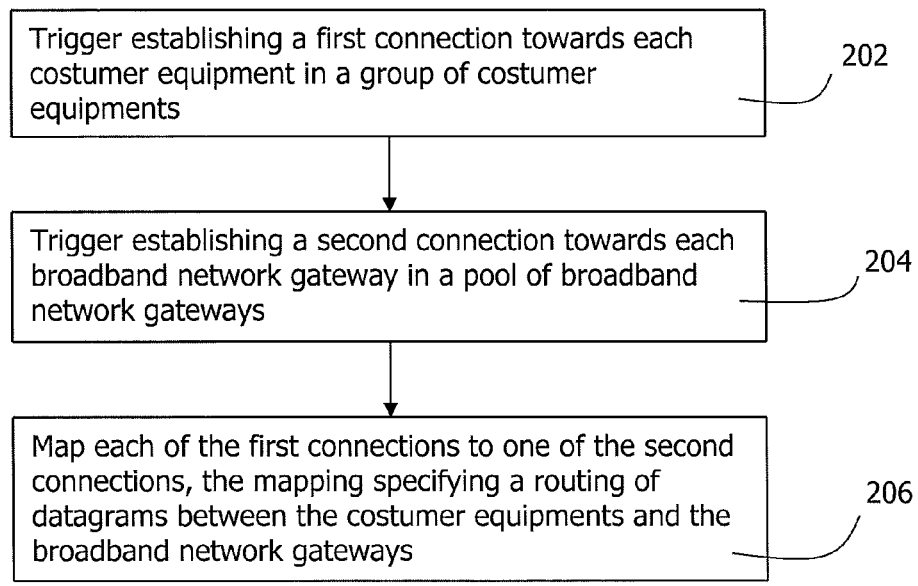
FIG. 2 shows a flowchart for a method of routing datagrams between customer equipments and broadband network gateways, which is implementable in the device of FIG. 1.

FIG. 2 shows a flowchart for a method 200 of routing datagrams between a group of customer equipments and a pool of broadband network gateways. In a step 202 of the method 200, establishing a first connection towards each of the customer equipments in the group is triggered. Establishing a second connection towards each of the BNGs 204 is triggered in a step 204. The first and second connections are mapped in a step 206 so that each first connection is uniquely associated with one of the second connections.

Some or all of the second connections may be established prior to the step 202. The number of established second connections may be chosen so that there is a subset of unmapped second connections, e.g., for redundancy, load-balancing or scheduled maintenance.

The method 200 may be performed by one or more processors, e.g., in the device 120. The steps 202, 204 and 206 may be performed by the functional units 122, 124 and 126, respectively.

In the step 204, the device 120 sets up one second connection 125 per BNG 112 in the pool 110. In an implementation of the device 120, e.g. using existing protocols between the BNG 112 and the device 120, the capacity information is statically provisioned to the device 120. In an advanced implementation, the device 120 receives capacity information as to the individual capacities of the BNGs 112 in the pool 110, e.g., in response to the step 204.

The mapping step 206 realizes load sharing by considering the relative capacities of the BNGs 112. Connection information for identifying the established first connections 123, e.g., a VLAN tag, is forwarded along the mapped second connections 125 to the corresponding BNGs 112.

Network level redundancy is the capability of the device 120, e.g., the PE router, to detect that a serving BNG pool member, i.e., one of the BNGs 112 which second connection 125 is mapped to one or more of the first connections 123, is out of service and to re-distribute traffic of the one or more first connections 123 to other BNG pool members. In an advanced embodiment, the one or more first connections 123 are mapped to one or more previously unmapped second connections 125 or previously mapped second connections 125 with residual capacity.

In a reduced embodiment, the device 120 tries to establish a session (e.g., a L2 VLAN connection) via one of the second connections 125 to one of the BNGs 112. In case of a failure, the device 120 re-tries a next second connection 125 to a next BNG 112 in the pool 100, until the session is successfully re-established.

Forcefully changing the L2 mapping of the first connection 123 of the CE 102 to another second connection 125 may trigger the CE 102 to re-establish its session (e.g., involving layers higher than L2).

In case of a planned maintenance for one of the BNGs 112 in the pool 110, the capacity of the BNG 112 is set to zero. As a result, no further first connection (and thus no L2 session) is dynamically mapped to the second connection 125 of the BNG 112. After a shut-down timer at the device 120 has expired, the mapping of the one or more first connections 123 previously mapped to the second connection 125 of the BNG 112 is changed to one or more other second connections 125. As a result, all existing L2 sessions are disconnected from the BNG 112 and re-distributed, which is less service-impacting than directly shutting down the BNG 112.

In case an overall capacity of the BNGs 112 in the pool 110 needs to be enhanced, a further BNG 112 is added to the pool 110 as a new pool member. Based on the non-zero residual capacity of the added BNG 112, a new first connections 123 (e.g., triggered by an L2 session requests received by the device 120) are mapped to the second connection 125 of the added BNG 112. Hence, the new session enters the added BNG 112.

Figure 3:
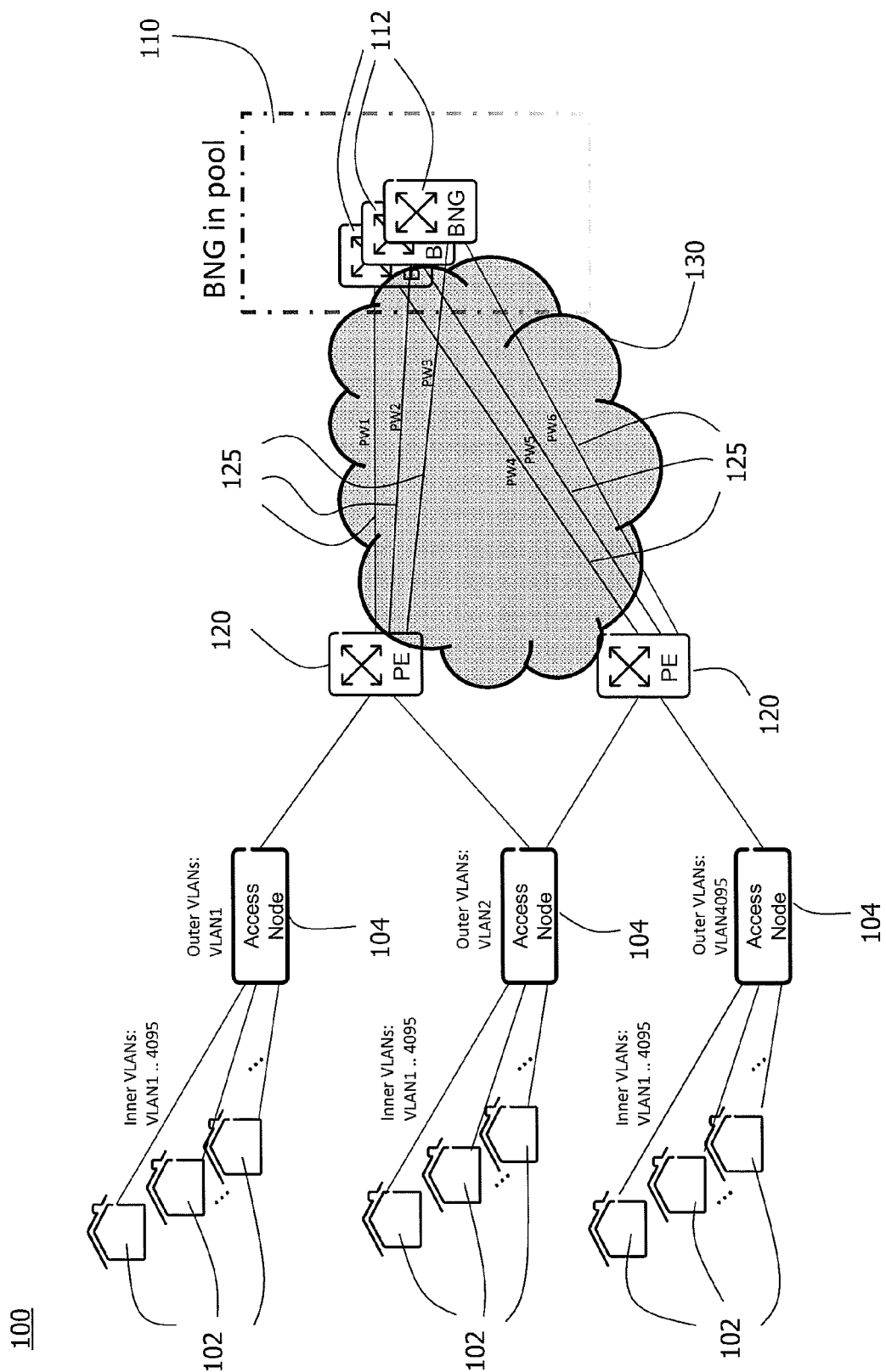
FIG. 3 schematically illustrates a second embodiment of a system for providing broadband access comprising a provider edge router for performing the method of FIG. 2.

FIG. 3 schematically illustrates a second embodiment for the system 100 including a plurality of access nodes 104. The need to enhance the overall capacity and/or to establish new first connections may be triggered by adding a new access node 104 to the BNG pool 110. Each access node 104 (e.g. a DSLAM or optical termination) hosts a number of CEs 102 located in the subscriber premises, which can be represented by C-VLANs.

In a variant of the second embodiment, the system 100 comprises more than one device 120, e.g., one device 120 implemented at each of a plurality of the PE routers. Two or more of the devices 120 are connected to one access node 104, as is illustrated for the access node in the center of FIG. 3. Connecting two or more of the devices 120 to one access node 104 provides redundancy from the perspective of the access node 104.

In the second embodiment of the system 100, each CE 102 (i.e., each fixed-network subscriber) matches a QinQ VLAN tag. E.g., each CE 102 defines C-tags. The corresponding C-VLAN is also referred to as an inner VLAN. The access node 104 aggregates the Ethernet traffic of the plurality of CEs 102. Each access node 104 defines an S-tag in addition to the C-tag. The combination of S-tag and C-tag (i.e., the QinQ VLAN tag) defines a stacked VLAN and uniquely identifies each of the first connections 123.

The double-tagged frames (or QinQ-tagged frames) are routed by the PE router according to the mapping. Each BNG 112 in the pool 110 is capable of handling all L2 subscriber information (e.g., the QinQ tags).

The device 120 dynamically creates the second connections 125 (e.g., L2 tunnels such as PWs) for carrying the L2 session associated with one of the stacked VLANs. The device 120 implements a mechanism to map (i.e., cross-connect) the first connections (e.g., the active subscriber VLANs on attachment circuits of the one or more access nodes 104) across all working second connections 125.

The mapping unit 126 realizes an (N+1)-geographical BNG redundancy. The operation of the device 120 according to the method 200 is controlled by a data model. The data model may be implemented as an enhancement to existing PE routers.

The data model comprises a first status list with entries for each of the first connections 123, e.g., the connected VLANs coming from the access nodes 104 and representing a residential access CE 102. The first connections 123 are identified based on a VLAN identifier, a C-VLAN identifier (e.g., C-tag), an S-VLAN identifier (e.g., S-tag), an ATM Permanent Virtual Circuit (ATM PVC), etc. Alternatively or in addition, the entry is indicative of a service (e.g., telephony or video streaming) within the CE 102 associated with the first connection 123.

The data model further comprises a second status list of pooled BNGs 112, for example represented by their IP addresses. Entries in the second status list include a static capacity figure of each pooled BNG 112, for example a maximum number of supported subscribers of the BNG node 112. Alternatively or in addition, the entries include a state of reachability (also referred to as availability) of the BNGs 112. For example the state may indicate whether the respective second connections 125 to the BNGs 112 are up and/or can be established for L2 sessions to the respective BNGs 112.

The entries further comprise a state of load per BNG 112. E.g., the load is represented by a number of subscriber L2 sessions via the device 120 to a specific BNG 112. Alternatively or in addition, the data model comprises a table storing all established L2 sessions over the second connections 125 (e.g., within the L2 tunnels such as PWs) towards the BNGs 112 of the pool 110.

A mapping table stores the relation between the CEs 102 (e.g. the C-VLANs 123) and the L2 session over the second connections 125 (e.g., the L2 tunnels). A forwarding model (also referred to as switching matrix) for incoming L2 access frames from the CEs 102 maps to the outgoing L2 session towards a BNG.

The data model can be manually configured, dynamically provisioned by an Operations Support System (OSS) or dynamically fetched by the device 120 from an administration database.

Figure 4:
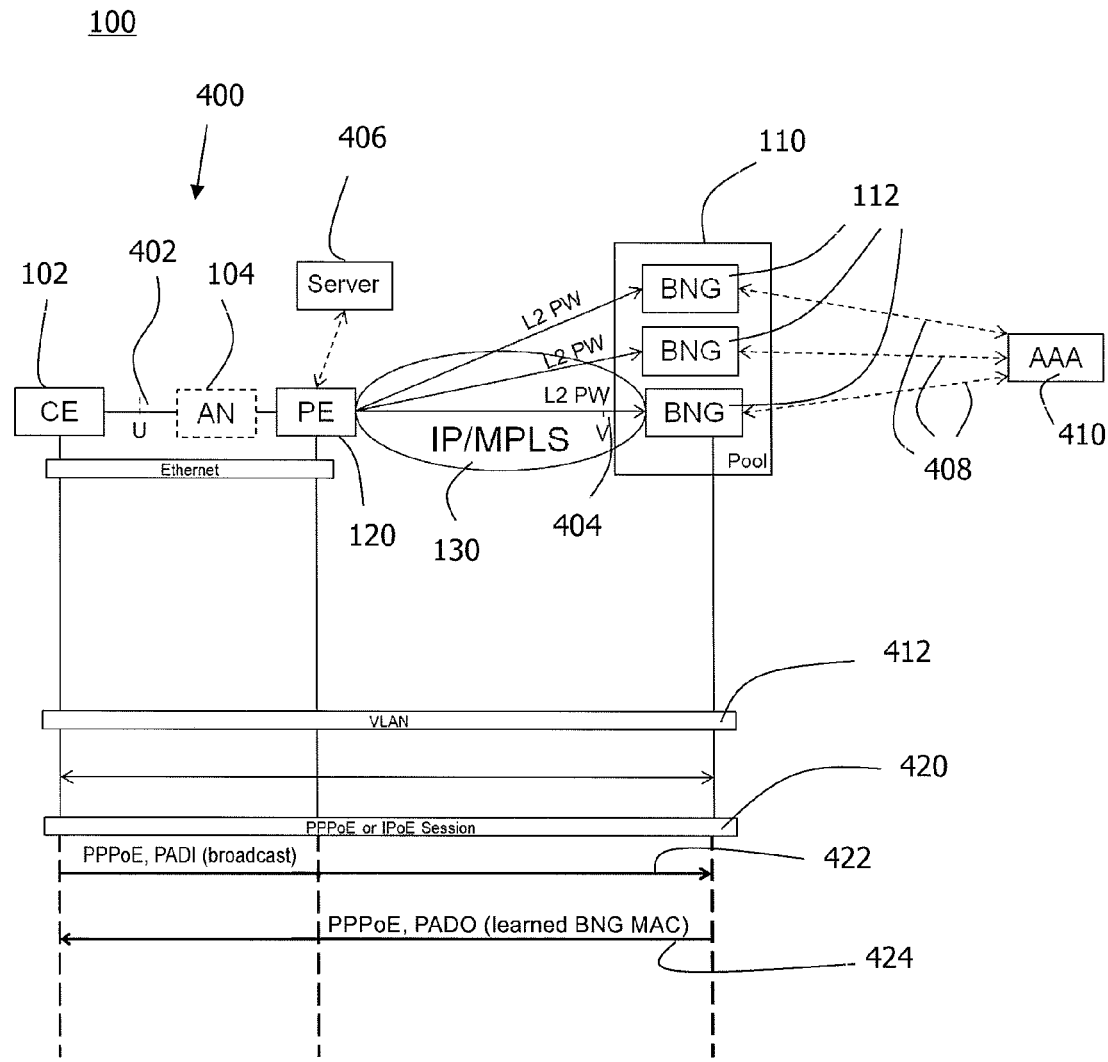
FIG. 4 schematically illustrates a third embodiment of a system for providing broadband access comprising a provider edge router for performing the method of FIG. 2.

FIG. 4 schematically illustrates a third embodiment of the system 100. Any feature of the third embodiment can be implemented in variants of the first and second embodiments.

The system 100 comprises an access network 400 providing Ethernet access from the CE 102. The access network 400 optionally includes access nodes 104 and/or a first reference point 402 according to Sect. 2.2 of the document BBF TR-101. The transport network 130 (also referred to a metro network) uses IP or MPLS transport. The transport network 130 optionally includes a second reference point 404 according to Sect. 2.5 of the document BBF TR-101.

The PE router implements the device 120. The PE router is manually provisioned or automatically fetches provisioning data from the database of an administration server 406. The mapping is stored in the switching matrix. The switching matrix is stored at the device 120 implemented at the PE router. In a variant, the device 120 is not implemented in the PE router. E.g., the device 120 is implemented by the administration server 406 connected to the PE router. In the variant, the switching matrix is stored at the PE router. The device 120 remotely updates the switching matrix or transfers an updated switching matrix to the PE router for initializing or changing the mapping.

The device 120 automatically establishes the second connections 125 as L2 tunnels (for example implemented as MPLS PWs) to each BNG 112 of the pool 110 in the step 204. The tunnels represent the L2 point-to-point connectivity used for dynamically connecting each first connection 123 (i.e., the subscriber C-VLAN of the CE 102) to one of the BNGs 112. Once the second connections 125 have been set up, the PE router maintains the accessibility of each BNG 112 and the relative capacity of each BNG 112 in the pool 110.

For each defined first connection 123 (e.g., each C-VLAN), the device 120 automatically initializes an Ethernet switching matrix for mapping the one or more first connections 123 to an L2 session in the respective L2 tunnel connecting one BNG 112 of the pool 110.

The mapping 206 thus gives rise to an L2 connectivity 412 (e.g., an Ethernet link or VLAN) between the CE 120 and the selected BNG 112.

In at least some implementations, the subscriber handling at the BNGs 112 is not affected by the dynamical mapping of the step 206. The pool 110 is transparent from the perspective of each BNG 112. By way of example, the BNG 112 handles the L2 session in the L2 tunnel as an attached subscriber CE 102 (e.g., as in a conventional system).

The L2 connectivity 412 between the CE 102 and selected BNG 112 ensures that the upper layer sessions (e.g., a point-to-point session and application sessions) can be established.

In a discovery stage for establishing a PPPoE session 420, the CE 102 broadcasts a PPPoE Active Discovery Initiation (PADI) packet on the VLAN 412. The device 120 forwards the PADI packet 422 according to the mapping to the BNG 112.

The BNG 112 replies by sending a PPPoE Active Discovery Offer (PADO) packet 424 including the MAC address of the BNG 112, its name and the name of the service.

Establishing a point-to-point session (or an Internet Protocol over Ethernet, IPoE, session) is then initiated by the CE 102. The BNG 112 identifies the subscriber based on upper layer information. E.g., the BNG 112 identifies the subscriber based on session information provided by the CE 102. Alternatively or in addition, the CE 102 is identified based on the QinQ tag added by the access node 104.

The BNGs 112 fetch subscriber data 408 from a central authentication server 410 providing Authentication, Authorization and Accounting (AAA) functionality. The data 408 may be exchanged using the Remote Authentication Dial-In User Service (RADIUS) protocol according to RFCs 2865 to 2869 or the Diameter protocol.

The switching matrix indicative of the mapping of the first connections 123 (e.g., C-VLANs) to the second connections 125 (e.g., L2 tunnels) is fixed as long as no second connection 125 goes down and the L2 point-to-point sessions between corresponding CEs 102 and BNGs 102 do not exceed the respective maximum capacity.

An implementation of the method 220 for changing the mapping, e.g., for handling a failure of an L2 tunnel or a BNG 112, is described with reference to a signaling flow 500 shown in FIG. 5.

The device 120 triggers an initial setup of the second connections 125 based on system architecture in a step 510 as an implementation of the step 204. The device 120 sends requests messages 512 via the second connections 125 to the corresponding BNGs 512 for testing availability and optionally for requesting capacity information.

The device 120 stores active sessions (e.g., L2 VLAN connections 412) between the CEs 102 and the BNGs 112 for each second connection 125 (e.g., per PW) in a step 514, e.g., based on reports 516 received from the BNGs 112.

Alternatively or in addition, the reports 516 indicate the capacities of the corresponding BNGs 112. Based on the capacities of the BNGs 112 (i.e., the maximum available capacities) and the active sessions (i.e., the occupied capacities), the device 120 initializes or changes the mapping (e.g., for load-balancing, BNG maintenance or BNG redundancy). The mapping is initialized or changed avoiding that the second connection 125 of a fully loaded BNG 112 is mapped to a further first connection 123.

Figure 5:
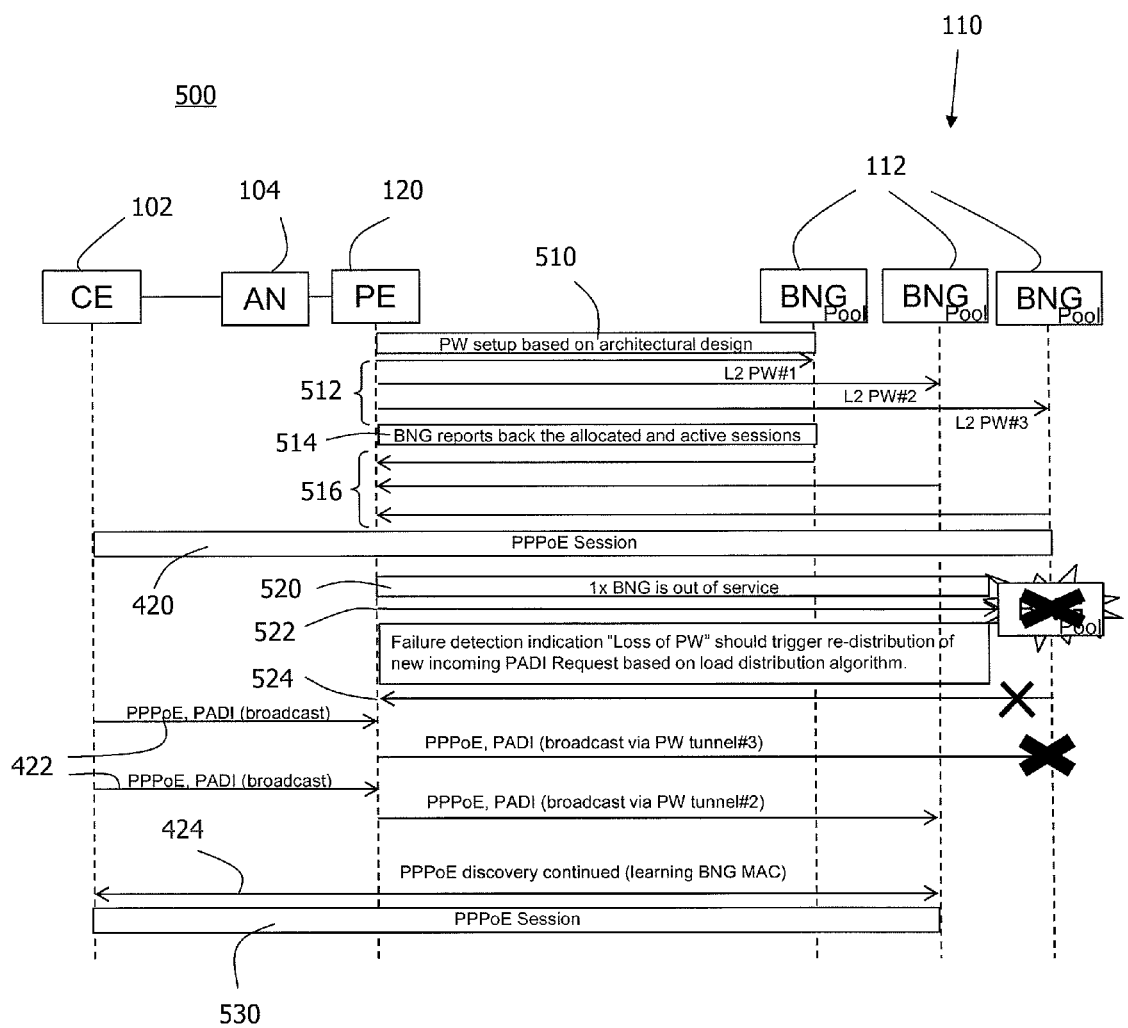
FIG. 5 schematically illustrates a signaling flow resulting from an implementation of the method of FIG. 2.

In the example illustrated in FIG. 5, the first connection 123 towards the CE 120 is mapped to the second connection 125 towards the third BNG 112. The point-to-point session 420 is established between the CE 120 and the third BNG 112 as described with reference to FIG. 4.

The device 120 determines in a step 520 a failure of any one of the BNGs 112 having a second connection 125. By way of example, the device 120 sends tunnel keep-alive (KA) messages 522 along the second connections 125. After expiry of a KA timer at a time 524, the device 120 determines that the third BNG 112 in unreachable.

Alternatively or in addition, the device 120 selectively releases the second connection to one of the BNGs 112 to trigger load re-distribution, e.g., when the one BNG 112 is taken out of service for maintenance. Independent of cause, the associated CE 120 observes a PPPoE session timeout. The session timeout causes the CE 120 to broadcast PADI packets 422.

The device 120 dynamically updates the mapping of the first connection 123 (e.g., a C-VLAN) to another second connection 125 (e.g., an L2 session or L2 tunnel). The PADI packets 422 from the CE 120 are thus forwarded along the other second connection 125. As a result, a point-to-point link 424 to another BNG 112, e.g., the second BNG 112 in the example of FIG. 5, is established according to the changed mapping, e.g., for load distribution.

Once the L2 connectivity (e.g., an Ethernet link) is re-established, a point-to-point session 530 (e.g., a PPPoE session or a IPoE session) is established by the CE 120. The newly connected BNG 112, e.g., the second BNG 112 in FIG. 5, fetches the subscriber data for a user of the CE 120 and/or the previous CE session 420, e.g., from the central authentication server 410. The session 530 thus replaces the session 420.

As has become apparent from above description of exemplary embodiments, an automatic and efficient load balancing mechanism can be realized between multiple BNGs for newly connecting CEs. Failure cases, e.g. a BNG failure, can be automatically resolved with minimum hardware redundancy. E.g., a number of passive BNGs is minimized.

Existing provider edge routers or Fixed-Mobile Convergence access routers can be enhanced by the technique. Similar routing products deployed for mobile access and fixed access.

The technique can be implemented in an architecture for mapping a dynamic customer VLAN to an L2 connection. The L2 connection can be automatically set-up to pooled BNGs, e.g., allowing N+1 redundancy. In this way, scalability, flexible of provisioning and efficient usage of the resources in the fixed networks is improved. Furthermore, geographically dispersed BNG pool members can result in geo-redundancy.

Same or other embodiments allow introducing new BNG pool members to enhance the capacity of the BNG pool. The fixed network subscribers VLANs, or groups thereof in an access node, are load-shared across BNG pool members considering a relative capacity of each BNG pool member.

Embodiments provide for soft off-loading of BNGs, e.g., to exchange HW without service stoppage. Ongoing sessions can be manually terminated and the subscriber VLANs can be distributed over remaining BNG pool members, so that the CE re-initiates the subscriber sessions.

Quality of Service (QoS) considerations can be implemented with the technique. E.g., a preferred choice of hardware can be allocated to certain subscribers by the mapping.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A device for routing datagrams between customer equipments (CEs) and a pool of broadband network gateways (BNGs) the device comprising:
   processing circuitry;
   an interface to a database;
   memory containing instructions executable by the processing circuitry whereby the device is operative to:
      trigger establishing a first connection between the device and each of the CEs;
      trigger establishing a second connection between the device and each BNG in the pool of BNGs;
      map each of the first connections consecutively to one of the second connections according to a sequence or closest geographical distance such that if the next second connection or the corresponding BNG is not available or has an insufficient capacity, the second connection that is next according to the sequence or the closest geographical distance is skipped, the mapping specifying the routing of the datagrams;
      receive and/or estimate information as to a capacity for at least one of the BNGs in the pool and the second connections; and
      maintain a list of available BNGs and the associated capacity information in the database.

2. The device of claim 1, wherein the mapping includes storing a forwarding rule for the mapped first and second connections, the forwarding rule specifying the forwarding of an incoming access frame on a first connection to an outgoing frame on a second connection.

3. The device of claim 1, wherein each of the first connections between the device and the CEs includes a Data Link layer tunnel.

4. The device of claim 1, wherein each of the first connections between the device and the CEs is defined by a tagged virtual local area network.

5. The device of claim 1, wherein each of the second connections between the device and the BNGs includes a Data Link layer tunnel.

6. The device of claim 1, wherein the instructions are such that the device is operative to periodically trigger sending messages towards the BNGs in the pool for determining an availability of at least one of the BNGs in the pool and the second connections.

7. The device of claim 1, wherein the mapping of the first connections to the second connections depends on at least one of the availability and the capacity.

8. The device of claim 7, further comprising an interface for setting at least one of the capacity and the availability of one of the BNGs to zero for triggering off-loading the BNG.

9. The device of claim 1, wherein the instructions are such that the device is operative to map and/or trigger establishing a further second connection if a sum of the capacities or the availabilities is less than a sum of capacities of the first connections or a number of the first connections.

10. The device of claim 1, wherein the instructions are such that the device is operative to trigger establishing a further second connection to a further BNG in response to at least one of:
    establishing one of the first connections;
    an unavailability or maintenance status of one of the second connections; and
    an unavailability or maintenance status of the corresponding one of the BNGs.

11. The device of claim 1, wherein the mapping is initialized according to an architectural structure of the pool of BNGs.

12. The device of claim 1, wherein the mapping includes re-mapping one of the first connections to another one of the second connections in response to at least one of:
    establishing one of the first connections;
    an unavailability or maintenance status of the second connection previously mapped to the one of the first connections;
    an unavailability or maintenance status of the corresponding one of the BNGs; and
    an availability of one or more further BNGs in the pool.

13. The device of claim 1, wherein the instructions are such that the device is operative to bi-directionally forward the datagrams between the CE and the BNG, according to the mapping.

14. The device of claim 1, wherein the first connections include landlines and/or the CEs include fixed-line terminals.

15. The device of claim 1, further comprising:
    at least one first interface towards the CEs; and
    at least one second interface towards the BNGs,
    wherein the first connections use the at least one first interface, and the second connections use the at least one second interface.

16. A method of routing datagrams between customer equipments (CEs) and a pool of broadband network gateways (BNGs), the method comprising:
    triggering establishing a first connection between the device and each of the CEs;
    triggering establishing a second connection between the device and each BNG in the pool of BNGs;
    mapping each of the first connections consecutively to one of the second connections according to a sequence or closest geographical distance such that if the next second connection or the corresponding BNG is not available or has insufficient capacity, the second connection that is next according to the sequence or the closest geographical distance is skipped, the mapping specifying the routing of the datagrams;
    receiving and/or estimating information as to a capacity for at least one of the BNGs in the pool and the second connections; and maintaining a list of available BNGs and the associated capacity information in a database.

17. The method of claim 16, further comprising storing a forwarding rule for the mapped first and second connections, the forwarding rule specifying the forwarding of an incoming access frame on a first connection to an outgoing frame on a second connection.

18. The method of claim 16, further comprising periodically triggering a sending of messages towards the BNGs in the pool for determining an availability of at least one of the BNGs in the pool and the second connections.

19. The method of claim 16, further comprising triggering an establishing of a further second connection to a further BNG in response to establishing one of the first connections, an unavailability or maintenance status of one of the second connections, and/or an unavailability or maintenance status of the corresponding one of the BNGs.

20. A non-transitory computer readable recording medium storing a computer program product for routing datagrams between customer equipments (CEs) and a pool of broadband network gateways (BNGs), the computer program product comprising software instructions which, when run on processing circuitry of a computing device, causes the computing device to:
- trigger establishing a first connection between the device and each of the CEs;
- trigger establishing a second connection between the device and each BNG in the pool of BNGs;
- map each of the first connections consecutively to one of the second connections according to a sequence or closest geographical distance such that if the next second connection or the corresponding BNG is not available or has an insufficient capacity, the second connection that is next according to the sequence or the closest geographical distance is skipped, the mapping specifying the routing of the datagrams;
- receive and/or estimate information as to a capacity for at least one of the BNGs in the pool and the second connections; and
- maintain a list of available BNGs and the associated capacity information in the database.

* * * * *